United States Patent
De Vries et al.

(10) Patent No.: US 8,179,528 B2
(45) Date of Patent: May 15, 2012

(54) ASSEMBLY COMPRISING A PORTABLE DEVICE HAVING FLUID-FILLABLE CONTAINER AND A HOLDER

(75) Inventors: Bartele Hendrik De Vries, Drachten (NL); Merijn Wijnen, Eindhoven (NL); Marcus Benedictus Hoppenbrouwers, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 339 days.

(21) Appl. No.: 12/515,969

(22) PCT Filed: Nov. 27, 2007

(86) PCT No.: PCT/IB2007/054810
§ 371 (c)(1),
(2), (4) Date: May 22, 2009

(87) PCT Pub. No.: WO2008/065613
PCT Pub. Date: Jun. 5, 2008

(65) Prior Publication Data
US 2010/0020322 A1      Jan. 28, 2010

(30) Foreign Application Priority Data
Nov. 30, 2006   (EP) .................... 06125096

(51) Int. Cl.
*G01N 21/00*   (2006.01)
*G01C 9/00*    (2006.01)
*G02B 27/32*   (2006.01)

(52) U.S. Cl. ........................ 356/338; 356/247

(58) Field of Classification Search ........... 356/335–344
See application file for complete search history.

(56) References Cited

U.S. PATENT DOCUMENTS

| | | | | |
|---|---|---|---|---|
| 1,991,192 | A * | 2/1935 | Bucky | 73/290 R |
| 4,193,004 | A * | 3/1980 | Lobdell et al. | 250/577 |
| 4,440,022 | A * | 4/1984 | Masom | 73/293 |
| 4,852,621 | A * | 8/1989 | Bear | 141/83 |
| 5,012,972 | A * | 5/1991 | Nordstrom et al. | 229/162.6 |
| 5,121,541 | A * | 6/1992 | Patrakis | 30/41 |
| 5,286,192 | A * | 2/1994 | Dixon | 433/80 |
| 5,321,866 | A * | 6/1994 | Klupt | 15/22.1 |
| 6,308,413 | B1 * | 10/2001 | Westerhof et al. | 30/41 |
| 6,918,153 | B2 * | 7/2005 | Gruber | 15/22.1 |
| 7,080,980 | B2 * | 7/2006 | Klupt | 433/80 |
| 7,199,388 | B2 * | 4/2007 | Omatoi | 250/573 |
| 2005/0189004 | A1 | 9/2005 | Hoser et al. | |

FOREIGN PATENT DOCUMENTS

| | | |
|---|---|---|
| DE | 19504173 A1 | 8/1996 |
| EP | 1445589 A1 | 8/2004 |
| GB | 2417007 A | 2/2006 |
| JP | 2003315138 A | 6/2003 |
| JP | 2005313768 A | 11/2005 |

* cited by examiner

*Primary Examiner* — Gregory J Toatley
*Assistant Examiner* — Jarreas C Underwood

(57) ABSTRACT

An assembly including a holder and a fluid-fillable container. The holder is adapted for holding at least the container and includes a system for filling the container with a fluid from a fluid source. The holder further includes a detector for detecting the fluid level inside the container, a light source for at least locally illuminating the interior of the container and an optical detector. The detector is arranged outside the container and for detecting a fluid level inside the container by detecting light scattered inside the container resulting from the light emitted by the light source.

20 Claims, 4 Drawing Sheets

ASSEMBLY COMPRISING A PORTABLE DEVICE HAVING FLUID-FILLABLE CONTAINER AND A HOLDER

FIELD OF THE INVENTION

The present invention relates to portable devices comprising a fluid container.

BACKGROUND OF THE INVENTION

Certain portable devices such as handheld domestic appliances are provided with a container which is filled with a fluid, e.g. lotion, gel or soap, so as to provide the possibility to supply the fluid to a part of the device where it is desired. When the container is empty the user may replace it by a filled container. In order to decrease the frequency of having to replace the container, the container volume may be increased. This, however, may render the container and hence a device comprising the container relatively bulky which is not preferred.

SUMMARY OF THE INVENTION

It is desired to improve the user-friendliness of a portable device with a fluid-filled container.

To that end, an assembly according to claim 1 is provided, which allows to (re-)fill an at least partly empty container to a particular level and which removes the need for the user to replace a spent container. Providing the holder instead of the container or the portable device with the detector allows to construct the container and/or the device relatively simple and light-weight, as a fluid level detector or—indicator may be omitted on the container and/or the portable device. The detector may e.g. be operable by electro-or magnetostatic, or—dynamical or optical means. The detector may preferably allow to detect the fluid level from the outside of the container.

The assembly according to claim 2 may provide an automated filling station for the container, increasing the user-friendliness of the assembly.

A preferred assembly is provided by the assembly according to claim 3, which allows to detect a fluid level without having to contact the fluid.

A proper light intensity level for operation of the detector of the assembly according to claim 3, may be provided by the assembly according to of claim 4.

A benefit of an assembly according to claim 5 may be that arranging the detector for detecting scattered light rather than light reflected by specular reflection off a fluid e.g. off a meniscus in air or by total internal reflection, increases the reliability of the detection since the detection of scattered light is less dependent on the alignment of the various components of the measurement setup.

In particular, it has been found that the amount of detected or generally detectable scattered light varies with the amount of fluid present in a container within the viewing angle of the detector and that such scattered light can be reliably detected over a relatively large solid angle, which is significantly wider than the angle of reflection of light off a surface.

By an assembly according to claim 6 additional flexibility may be provided for the design of the container, at least a wall portion of the container may be translucent, or even be transparent, at an operational wavelength of the detector. This wavelength may not be visible. The wall portion may have any size, varying from a window to the entire container, providing sufficient optical access to the interior of the container for the detector to detect the fluid level.

Preferably, at least a wall portion of the container is translucent or preferably even transparent at a visible wavelength e.g. such that a user may see inside the container and observe a fluid therein.

A preferred embodiment with which the reliability of the detection of the presence or absence of a fluid level may be improved is presented in claim 8.

The words "light" and "optical" in this text should be construed broadly to also comprise non-visible electromagnetic radiation, such as at ultraviolet or infrared wavelengths. Similarly, the word "fluid" comprises any liquids, gels and viscous fluids such as lotions, creams and toothpaste which are displaceable by pumping action. The word "window" indicates a region of an object which region is at least translucent, preferably even transparent, for light at the relevant wavelength.

During filling or emptying of a container, the fluid level in the container, and hence the detected optical intensity in case of the use of an optical detector, changes relatively gradually. This may complicate an accurate detection of the "full" condition. For increasing the sharpness of the signal, and consequently the reliability of the fluid level detection, the assembly may have the features of claim 9.

The narrow portion causes a relatively small change in the stored content to result in an appreciable change of the fluid level, facilitating reliable detection. The container may comprise a wider region above the narrow portion presenting a buffer volume to reduce the chance of spilling e.g. in case the response of the assembly of detector-operator-filling system is relatively slow.

A fluid-fillable container which is particularly suitable for use in the present assembly comprises a relatively narrow portion having a flexible or resilient wall, such that the cross-section of the relatively narrow portion may be reversibly changed by the fluid pressure.

The shape and the resiliency or flexibility of the narrow portion are preferably such that when the fluid level is below the narrow portion the portion has substantially one geometry e.g. two opposite walls approaching or touching each other and when the fluid level is in contact with or is within the narrow portion the pressure of the fluid against the walls is sufficient to deform the narrow portion to another shape. This may be caused by fluid being pumped in to the container under pressure or even already by the surface tension of the fluid e.g. in case of a somewhat viscous fluid such as a gel. Such a geometrical change of the shape of the container may be reliably detectable by a detector.

For improving the reproducibility and reliability of the level detection, the assembly may have the features of claim 11.

With an assembly according to claim 12 the risk of spilling of fluid during filling of the container is substantially reduced.

An assembly according to claim 13 may ensure that the components of the assembly are reproducibly and reliably positioned relative to each other and that the position may be maintained.

The holder is preferably adapted for receiving a fluid reservoir as the fluid source. Thus, the fluid container may be filled from a reservoir, which may be replaced after being emptied. Since the reservoir may comprise sufficient content for several fillings of the container, the frequency of replacing an item of the assembly may be significantly reduced, whereas at the same time the convenient size of the container and/or of the portable device comprising the container may be maintained. The container volume may even be reduced without loss of user-friendliness.

In a preferred embodiment, the container is part of a domestic appliance, such as a shaver, a toothbrush or an iron. Thus the assembly allows to provide the appliance with a sufficiently filled reservoir of the desired fluid, such as shaving lotion, tooth paste or an ironing fluid.

Another aspect of the invention is presented in claim 19, which allows the detection of a fluid level in a container from the outside thereof in a relatively reliable manner which is relatively insensitive to the alignment of the components of the detection setup.

It should be noted that Japanese patent publication JP 2003-315138 describes a liquid level detector which is equipped with light projecting and receiving means mounted on the outside of a light transmissive pipe. Adjustment is so made as to maximize the amount of light received by the receiving means 13 when the detection light is totally reflected at a position deeper than an internal surface of the pipe by a prescribed amount. In JP 2003-315138 it is required that the light source, the container wall and the detector are stably attached to each other.

The invention also includes any possible combination of features or subject matter as claimed in any one of the claims.

BRIEF DESCRIPTION OF THE DRAWINGS

The invention will hereafter be explained with reference to the figures which show a presently preferred embodiment by way of example.

DETAILED DESCRIPTION OF EMBODIMENTS

Figure 1A:
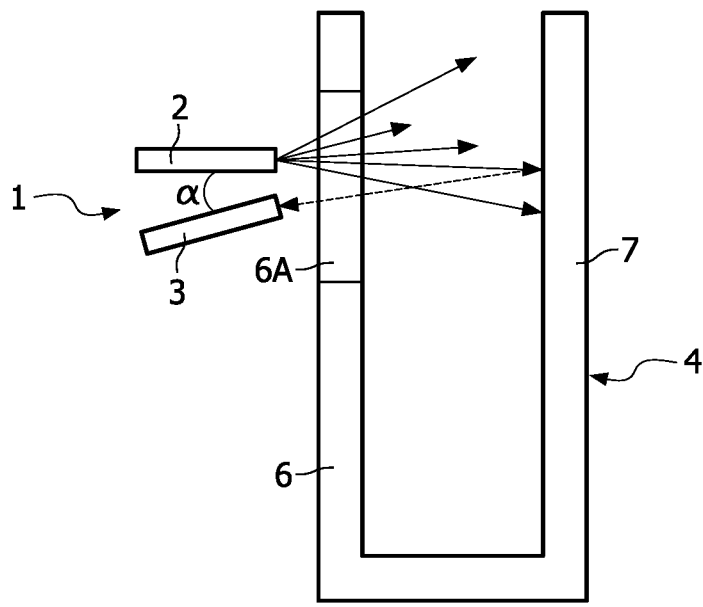
FIGS. 1A and 1B show an empty and a filled container, respectively, and an optical sensor and indicate the principle of operation of an optical detector relying on scattered light.
Figure 1B:
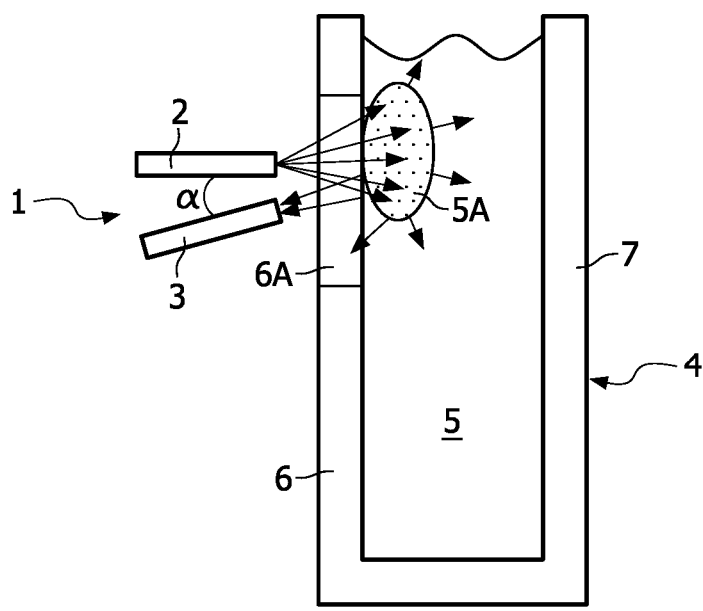

FIGS. 1A and 1B show a sensor 1, comprising a light source 2 and an optical detector 3, and a container 4 which may be filled with a fluid 5. The container 4 comprises a front wall 6 and a rear wall 7. The front wall 6 has a wall portion 6A which is translucent or preferably even transparent at wavelength(s) detectable by the detector 3.

The light source 2 is arranged to illuminate the interior of the container and the detector 3 to detect the resulting scattered light.

The light source 2 and the detector 3 are positioned such that the axes determined by the direction of the highest emitted intensity of the light source 2 and by the main direction of the viewing angle of the detector 3 enclose an acute angle α. The detector 3 may be arranged so that its viewing angle comprises at least a horizontal plane, parallel to the fluid level when at rest. Further, the light source 2 and the detector 3 may also be oriented parallel, which may be preferred.

FIG. 1A shows the light source 2 illuminating the interior of the container 4 and its contents (none, as the container is empty). The light is predominantly scattered by the container rear wall 7 and only a small fraction of the emitted light is scattered back into the detector 3. The exact fraction of the light detected by the detector 3 depends on the scattering characteristics of the container 4 or the rear wall 7 thereof at the wavelength(s) used, which, in turn, depend on the material properties and geometrical aspects of the container 4 and the light source 2: a generally smooth surface, for instance, causes a more specular-like reflection, whereas a generally rough surface causes a diffuse reflection, which is preferred. The rear wall 7 of the container 4 may also be adapted to absorb the light, which is preferred even more, as this may reduce background signal and thus may increase the reliability of the detection.

FIG. 1B shows that, when the container 4 is filled with a fluid 5, the fluid 5 will scatter the incoming light in a scattering volume 5A. The centre of the scattering volume 5A is closer to the light source 2 compared to the rear wall 7 of the container 4, so that the detector 3 receives a higher optical intensity and thus can generate a different signal, corresponding thereto.

The location and extent of the scattering volume 5A, and thus the scattered light detectable outside the fluid 5 are generally determined by the reflection, absorption and transmission characteristics of the fluid 5 at a particular wavelength. The scattering volume 5A may extend throughout the entire fluid. Generally fluids exhibit detectable backscattered intensity across a large solid angle, which, by the way, causes most fluid volumes and/or levels to be seen by the naked eye at all.

Thus, the illumination of the contents of the container 4 may be from various angle or from positions other than that of detection, depending on the optical properties of the fluid 5 and the container 4; highly translucent or transparent fluids 5, e.g. watery liquids or clear gels may carry light far, causing essentially the whole fluid body to "light up" which may be well detectable at any position along the fluid body. Essentially opaque fluids, such as toothpaste, may strongly scatter light and finally absorb forward scattered light, such that detectable scattered light is mainly light which is backscattered in the outer regions. For example, black shoe polish strongly absorbs at visible wavelengths but may fluoresce or be a strong scatterer, and thus be clearly detectable, at non-visible wavelengths such as infrared or ultraviolet. In the case of mainly backscattering fluids, illumination and detection at an acute angle to the normal to the illuminated fluid surface or illumination and detection along essentially parallel directions is preferred.

Although the light source may illuminate the fluid from various positions for the generation of scattered light from the fluid, it is preferred that the axes determined by the direction of the highest emitted intensity of the light source and by the main direction of the viewing angle of the detector preferably enclose an acute angle, preferably less than 45°, such as less than 10° or even parallel, around a normal to at least a container inner surface. This arrangement allows a compact construction, even allowing the light source and the detector to be combined or integrated in a single sensor. It also allows to use a relatively small window for the detection. Further, in such a setup, the assembly is adapted to detect scattered light intensity which mainly is comprised of generally backscattered light. This allow the detection of a fluid level of highly absorbent or substantially opaque fluids such as lotions, creams or toothpaste. In addition, when the wall is substantially perpendicular to the direction of illumination and detection, reflection losses of the light at the air-wall interface are reduced. Thus, due to one or more of these effects a relatively clear signal may be generated, increasing the reliability of the detection.

Thus using a detection scheme relying on scattering allows an assembly provided with such a detector to be widely applicable and causing the reliability of the assembly to be substantially independent of variations in the alignment of the components and of variations in the fluid to be detected.

To increase the reliability of the detection of scattered light the detector may be shielded from a direct optical contact such as a direct line of sight or via specular reflection. As the light scattered or emitted by the fluid may have a different wavelength than that of the light source e.g. due to fluorescence or phosphorescence of the fluid, the detector may be shielded by filtering the different wavelengths.

Figure 2A:
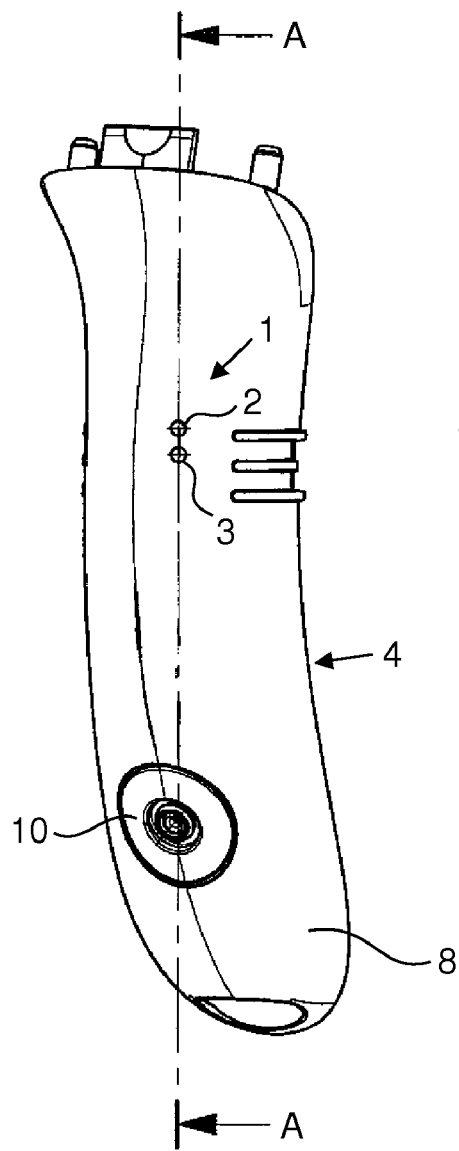
FIG. 2A shows a schematic elevation view and a view in cross-section, respectively, of a container and a separate sensor.
Figure 2B:
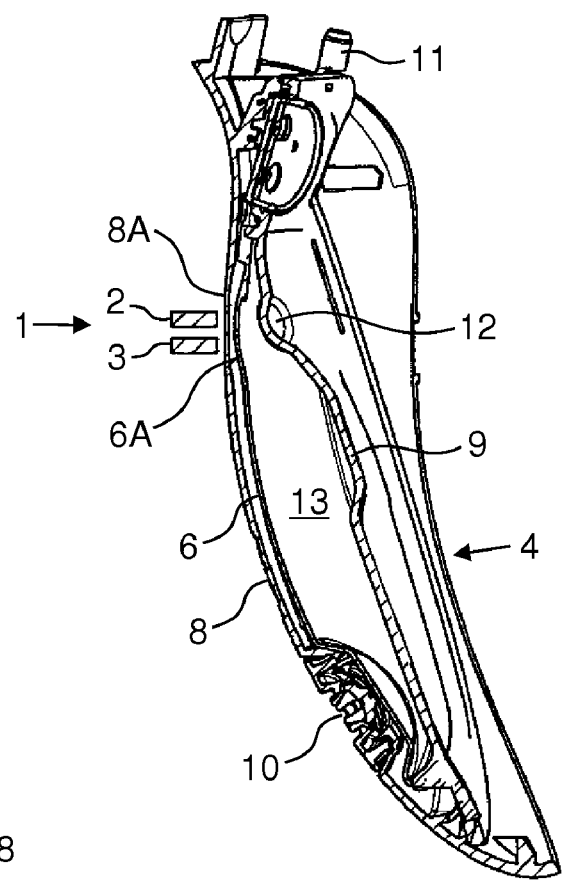
FIG. 2B is a cross-sectional view along the line A-A in FIG. 2A.
Figure 3:
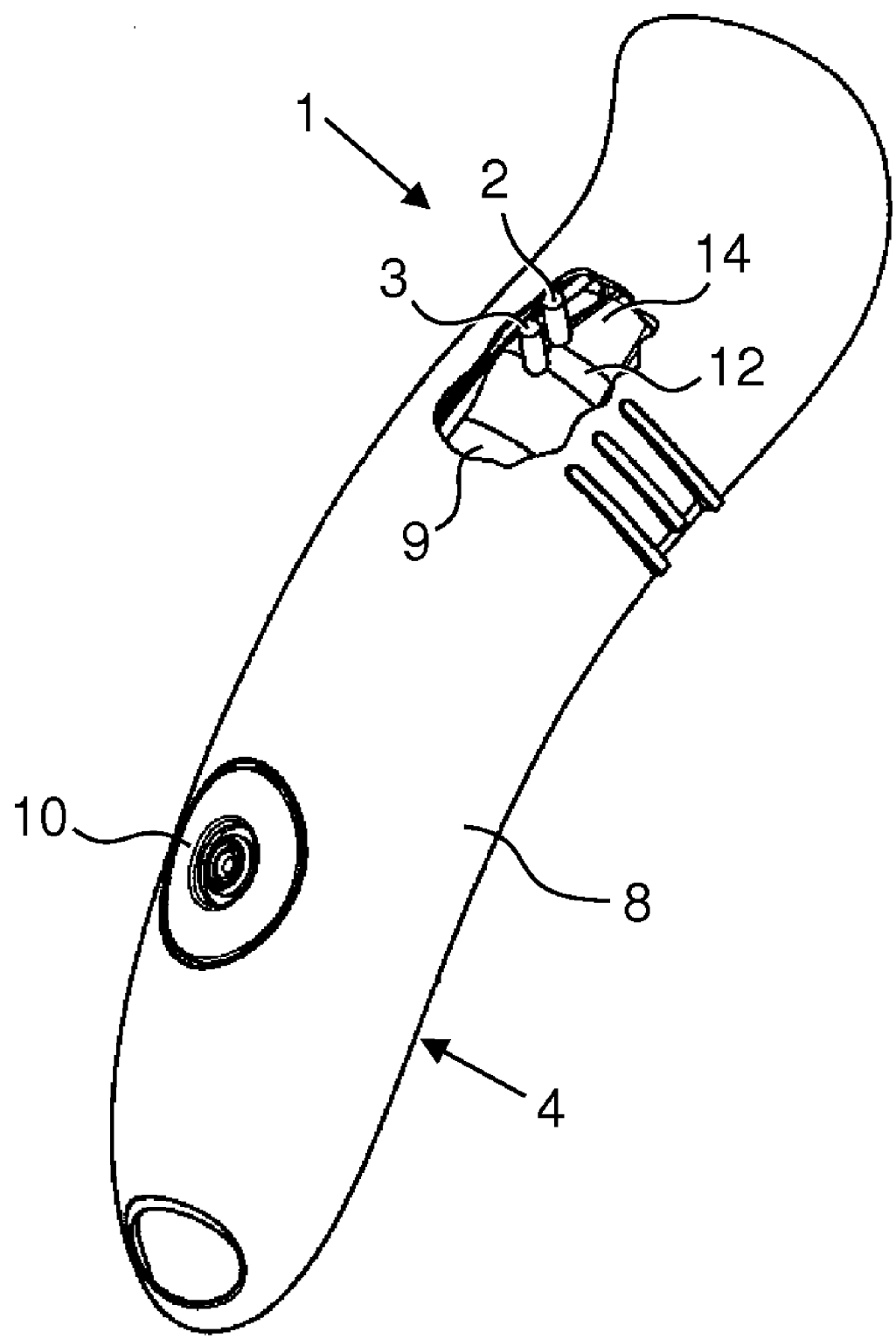
FIG. 3 shows a perspective view, partially broken away, of a container and a separate sensor.

In FIGS. 2A, 2B and 3 the sensor 1 which is formed separately from the container 4 is indicated as being formed of a light source 2 and an optical detector 3, which are placed essentially parallel.

The container 4 comprises a relatively rigid outer wall 8 and flexible inner walls 6 and 9. The container 4 is fluid fillable by means of a fluid inlet 10 near its lower end. The container comprises an exit opening 11 at or near its top.

At the position of the desired fluid level inside the container, the container walls 6 and 8 are provided with wall portions 6A, 8A, respectively, which are transparent to the operational light of the sensor (not indicated in FIG. 3). Elsewhere, the container wall may be, and preferably is, essentially opaque at the operational sensor wavelength, for reducing the chances of a false reading by the detector 3 due to environmental light being detected.

The container 4 further comprises, opposite the wall portions 6A, 8A a protrusion 12 on the flexible rear wall 9, which narrows the cross-section container to a constriction. The protrusion 12 provides a region of reduced flexibility in the flexible rear wall, yet the constriction remains reversibly deformable. A suitable container is a bladder of a relatively soft and thin material such as a plastic, silicone or rubber material, depending on the chemical composition of the used fluid, fit into an outer wall 8 which preferably is a rigid or semi-rigid shell of a hard and durable plastic material.

Figure 4:
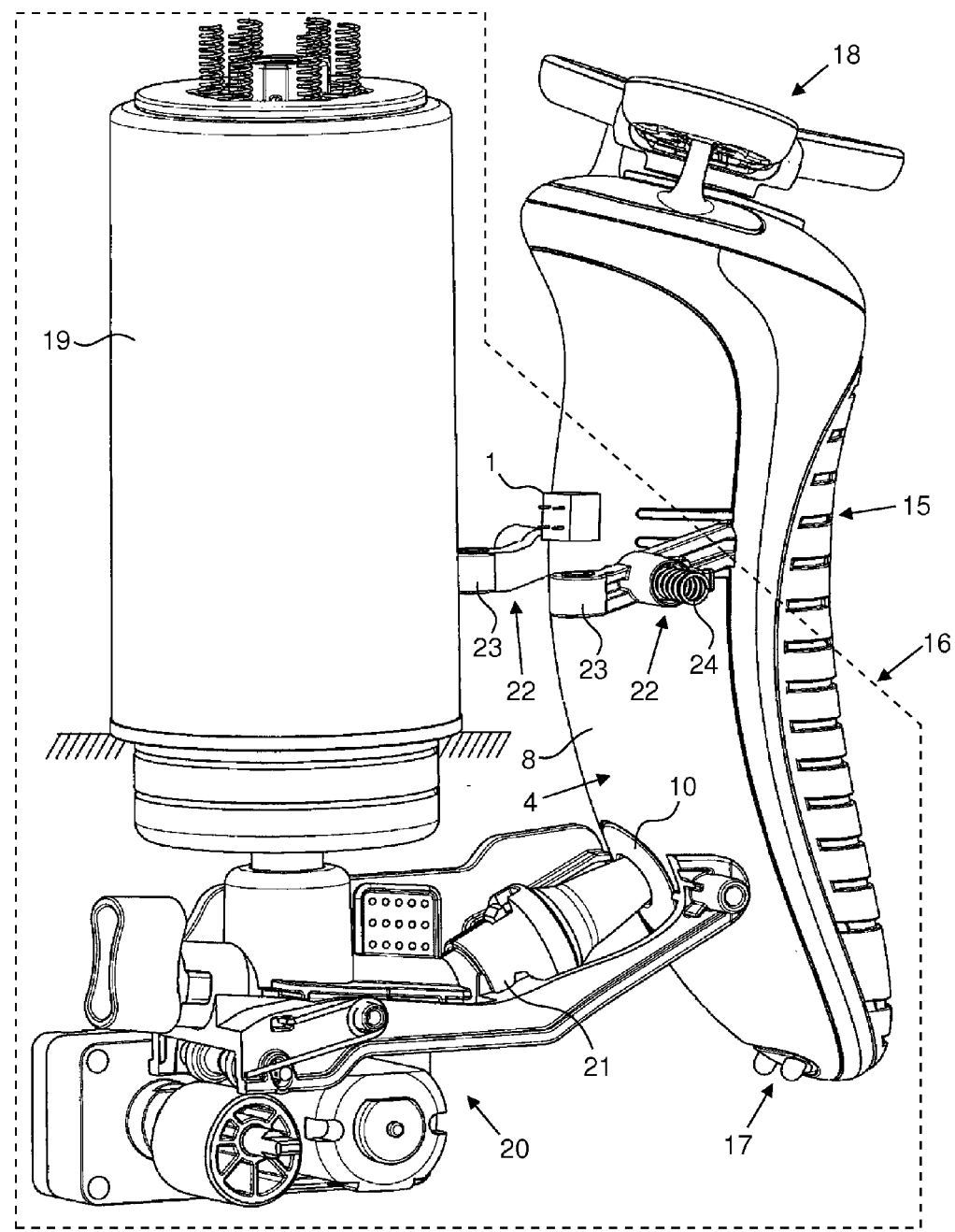
FIG. 4 shows a partial schematic elevation view, partially broken away, of an assembly according to the invention comprising an electric shaver in a corresponding holder.

FIG. 4 shows an assembly according to the present invention in the shape of a battery operable electric shaver 15 placed in a holder 16 (partially indicated).

The shaver 15 comprises the container 4, with the fluid inlet 10 as shown in FIG. 2 and an electrical connector 17 for charging the battery. The shaver 15 is provided with a system for pumping or expelling fluid, preferably a shaving or aftershave lotion, from the container 4 and dispensing the fluid at the shaving head 18 during shaving.

The holder 16 comprises the sensor 1 in the form of an integrated single device comprising the light source 2 and the detector 3. The holder 16 is adapted for receiving a fluid reservoir as a fluid source for filling the container 4. In FIG. 4 a removable can 19 is shown as a fluid reservoir in place for use. The holder comprises a pump assembly 20 for filling the container 4 with the fluid from the reservoir 19 via a fluid conduit 21 and the fluid inlet 10.

The holder 16 may further comprise an electrical power supply and a connector (not shown) for charging the battery of the shaver 15 through the connector 17 of the shaver 15.

The holder and the container are provided with mating coupling means in the form of clamps 22. The clamps 22 are pivotably mounted to the housing of the holder 16 with hinges 23. The clamps 22 derive clamping and holding action from being spring loaded against the body or the housing of the holder 16 with springs 24. The clamps 22 serve to clamp and hold the container 4 and therewith the shaver 15 in a suitable predetermined and substantially reproducible position relative to the holder for proper operation of the sensor 1 and for properly connecting the electrical connectors 17 and the fluid conduit 22 and inlet 10.

In normal operation, the container 4 is positioned essentially upright, as indicated by the position in the figures, in the holder and it is filled via the fluid inlet 10 with a fluid to the level of the sensor 1. When introducing more fluid into the container 4, the fluid might spill out the exit opening 11, which is undesirable.

The sensor 1 is provided for observing the intended maximum fluid level.

When the fluid level in the container 4, or rather the signal corresponding thereto, is below a predetermined threshold value, the pumping assembly 15 should be operated for filling the container 4. Similarly, at a sufficient or higher filling level, the pumping assembly 20 should not be operated, or halted when pumping. The stand 12 may comprise a controller or a processor for processing the signal of the detector and for operation of the pump assembly 20.

Here, the word "below" is used to designate the absolute amplitude of the signal with respect to a particular reference value.

The position of the sensor 1 coincides with the position of the protrusion 12, and for allowing to provide a signal for terminating the filling process. When the container is partly or totally empty, the protrusion 12 approaches the front wall 6 to form a constriction, almost closing off the container.

After filling the main storage volume 13 of the container 4, the fluid pressure should reach a sufficient value for pressing the protrusion 12 away from the opposite wall. The separation of the walls 6, 9 yields a relatively thick layer of fluid 5 for providing a relatively large scattering body to cause a clear signal of the detector 3. The deformation is preferably rather abrupt in the sense that it provides a significant difference in the cross-section below and above a certain fluid pressure. By providing the protrusion 10 with a different flexibility compared to the remainder of the flexible wall, the necessary fluid pressure for opening the constriction may be substantially set to a predetermined value.

Further, the deformation of the constriction in itself may alter the scattering properties such as the main scattering angle of the light off the walls of the protrusion and thus the intensity of scattered light reaching the detector to such an extent that the deformation of and thus the fluid level inside the container may accurately be determined by an optical detector relying on scattered light even with highly transparent and thus poorly scattering fluids such as clear fluids or tap water.

As indicated in FIG. 3, the protrusion 12 is provided with a channel 14 in the form of a recess in the protrusion 12, extending along the intended direction of the fluid flow when exiting the container. This allows the container 4 to be emptied better compared to a container having a protrusion 12 without the channel or recess 14. The channel 14 is oriented perpendicularly to the fluid level in the filling position when the container is positioned before the optical sensor 1. The light source 2 and the detector 3 are arranged along the channel 14, since it has been found that this yields a higher reliability of the detection compared to when the detector 3 and the light source 2 are arranged transverse to the axis of the channel 14.

The correct positioning of the container 4 or the shaver 15 in the stand may be determined from a sensor detecting the position of the clamps 22 and/or from the electrical contact of the charging connector 17. When the correct position of the container 4 or the shaver 15 is detected, the sensor 1 is operated for determining the presence of fluid at the level of the detector 3.

The determination of the correct position of the shaver 15 with respect to the holder 16 prior to operation of the sensor 1 or prior to processing signals generated by the sensor 1, forms an additional precautionary measure against the pumping assembly inadvertently pumping fluid from the fluid reservoir 19. Such pumping could lead to leaking when the fluid conduit 21 and inlet 10 are not properly connected, or even to general spilling when there is no container in place but when the detector accidentally receives a light intensity corresponding to the "empty" value.

Operating the sensor 1 only at and/or for a particular time also saves energy.

The optical sensor 1 preferably operates at a near-infrared frequency e.g. at a wavelength of ca. 950 nm, which is generally eye-safe and for which relatively powerful light sources such as light emitting diodes (LEDs) or even diode lasers are readily available at relatively low cost. Similarly, this light is well detectable with standard semi-conductor detectors, which are generally provided with infra-red transmissive filters for shielding against ambient light. Such a sensor 1 may also be an integrated device comprising the light source 2 and detector 3 in a single device 1. The materials of the container 4 and their surface texture are chosen such that they cause minimal light scattering to provide minimal background signal.

In a preferred situation the sensor 1 is positioned close to, preferably closer than about 0.5 mm, or even in physical contact with the container wall 8, ensuring that little or no ambient light falls on the detector 3 and that most, preferably all, fluid or dirt when present is expressed from the field of view. Thus the reliability of the detected signal is optimised. The space between the sensor 1 and the container 4 may also be provided with an essentially light-tight optical shielding such as a black rubber ring to further obscure the detector from ambient light. Optically sensitive surfaces of the sensor 1 may be provided with a protective window against scratching or dirt which might corrupt the signal. The sensor 1 may comprise a relatively inexpensive optical proximity detector known per se.

The signal of the detector 3 is preferably an electrical voltage which is easily comparable to one or more reference values with techniques well known in the art e.g. by providing a controller adapted for comparing the signal to a value stored in a memory, the reference values corresponding to a detected scattered light intensity caused by the container 4 being filled to a particular level.

The signal of the detector may have any shape or sign and any reference value. Preferably the signal is an electrical signal in the range of a few Volt, preferably in a range 0-10 Volt or, more preferably 0-5 Volt, the sign of the voltage (positive or negative) being relatively unimportant. Such voltages are easily detectable and processable with standard electronics.

The embodiments described above are for illustrating purposes only, as the invention may be modified in a number of ways within the scope of the claims.

Further, the device comprising the container may be any device which is generally used with a fluid, such as a steam-iron, a toothbrush, a shoe shining apparatus etc. provided with a reservoir for the corresponding fluid.

Further, the stand may be provided with an indication, e.g. a warning light for indicating that the container and or the fluid source such as the supply container/refill cartridge is empty. Another indicator may serve to indicate malfunction, such as incorrect position of the appliance or the container, or of (the window of) the sensor being dirty or obscured.

Further, the assembly may be adapted to monitor several containers. For this a single light source may illuminate several containers, whereby each container is monitored with a dedicated detector. The containers may be comprised in a single device, e.g. for mixing purposes.

Similarly, the assembly may be adapted to monitor several levels in a single container.

The container may comprise several protrusions or constrictions corresponding to particular fill levels. Such a container may comprise regions of increased flexibility between the levels, so that a series of bulges, corresponding to particular volumes, which may be equal or different, may be formed between the monitored levels.

While the invention has been illustrated and described in detail in the drawings and foregoing description, illustration and description are to be considered illustrative or exemplary and not restrictive. The invention is not limited to the disclosed embodiments. Variations to the disclosed embodiments can be understood and effected by the skilled person in practicing the claimed invention, from a study of the drawings, the description and the claims. The word "comprising" does not exclude other elements, and the indefinite article "a" or "an" does not exclude a plurality. Any reference sign in the Claims should not be construed as limiting the scope.

The invention claimed is:

1. An assembly comprising a holder and a portable device having a fluid-fillable container including outer walls that narrow a cross section of the container at a narrow portion, the holder being adapted for holding at least the container and including a system for filling the container with a fluid from a fluid source, the holder including a detector for detecting the fluid level inside the container at or near the narrow portion, wherein the narrow portion includes a flexible or resilient wall, such that the cross-section of the narrow portion is reversibly changeable by the fluid filling the container.

2. The assembly according to claim 1, wherein the holder comprises a system for filling the container with a fluid from a fluid source and a controller for operating the system depending on a signal of the detector.

3. The assembly according to claim 1, wherein the detector is an optical detector.

4. The assembly according to claim 3, wherein the assembly further comprises a light source for at least locally illuminating an interior of the container.

5. The assembly according to claim 3, wherein the detector is arranged for detecting light scattered inside the container and by any contents thereof.

6. The assembly according to claim 3, wherein at least a wall portion of the container is translucent or transparent at an operational wavelength of the detector.

7. The assembly according to claim 1, wherein at least a wall portion of the container is translucent or transparent at a visible wavelength.

8. The assembly according to claim 3, wherein the detector is arranged such that its viewing angle comprises at least a horizontal plane.

9. The assembly according to claim 1, wherein the holder and the container or the portable device are provided with a mating coupling for positioning the container with respect to the detector in a predetermined position.

10. The assembly according to claim 1, wherein the holder and the container or the portable device are provided with a mating coupling for establishing an essentially fluid-tight connection between the holder and the container.

11. The assembly according to claim 9, wherein the coupling comprises a clamp.

12. The assembly according to claim 1, wherein the holder is adapted for receiving a fluid reservoir as the fluid source.

13. The assembly according to claim 1, wherein the portable device is a domestic appliance.

14. A domestic appliance comprising a holder and a portable device having a fluid-fillable container including outer walls that narrow a cross section of the container at a narrow portion, the holder being adapted for holding at least the container and comprising a system for filling the container with a fluid from a fluid source, the holder further comprising a detector for detecting the fluid level inside the container at or near the narrow portion, wherein the narrow portion includes a flexible or resilient wall, such that the cross-section of the narrow portion is reversibly changeable by the fluid filling the container.

15. Assembly comprising
a fluid-fillable container including outer walls that narrow a cross section of the container at a narrow portion that includes a flexible or resilient wall, such that the cross-section of the narrow portion is reversibly changeable by a fluid filling the container,
a light source for at least locally illuminating the interior of the container
and an optical detector,
the detector being arranged outside the container,
the detector being adapted for detecting a fluid level at or near the narrow portion by detecting light scattered inside the container and by any contents thereof resulting from the light emitted by the light source and for generating a signal dependent on the detected light intensity.

16. The assembly according to claim 1, wherein one of the outer walls positioned away from the detector comprises a protrusion that narrows the cross-section of the container to a constriction.

17. The assembly according to claim 1, wherein the container is opaque at an operational wavelength of the detector except for at least a wall portion of the container at or near the narrow portion that is translucent or transparent at the operational wavelength of the detector.

18. The domestic appliance according to claim 14, wherein the domestic appliance is a shaver.

19. The domestic appliance according to claim 14, wherein the domestic appliance is an iron.

20. The domestic appliance according to claim 14, wherein the domestic appliance is an iron a toothbrush.

* * * * *